United States Patent
Knorr

(10) Patent No.: US 8,674,645 B2
(45) Date of Patent: Mar. 18, 2014

(54) DRIVE FOR A MACHINE WITH PULSE-DECOUPLED WORKING POINT ADJUSTMENT

(75) Inventor: Markus Knorr, Augsburg (DE)

(73) Assignee: Siemens Aktiengesellschaft, München (DE)

( * ) Notice: Subject to any disclaimer, the term of this patent is extended or adjusted under 35 U.S.C. 154(b) by 180 days.

(21) Appl. No.: 13/195,111

(22) Filed: Aug. 1, 2011

(65) Prior Publication Data
US 2012/0194122 A1 Aug. 2, 2012

(30) Foreign Application Priority Data

Aug. 2, 2010 (EP) .................................... 10171571

(51) Int. Cl.
*G05B 11/32* (2006.01)

(52) U.S. Cl.
USPC ........... 318/625; 318/560; 318/561; 318/649; 318/721; 318/727

(58) Field of Classification Search
USPC ................ 318/560, 561, 625, 649, 721, 727; 310/12.22, 15; 250/440.11, 442.11
See application file for complete search history.

(56) References Cited

U.S. PATENT DOCUMENTS

| | | | | |
|---|---|---|---|---|
| 6,690,133 B2 * | 2/2004 | Knorr et al. | | 318/560 |
| 6,744,155 B1 * | 6/2004 | Stoiber | | 310/15 |
| 6,744,156 B2 * | 6/2004 | Doi | | 310/49.47 |
| 7,012,264 B2 * | 3/2006 | Terken et al. | | 250/442.11 |
| 7,292,317 B2 * | 11/2007 | Cox et al. | | 355/72 |
| 7,348,752 B1 * | 3/2008 | Butler | | 318/649 |
| 2002/0145398 A1 * | 10/2002 | Knorr et al. | | 318/560 |
| 2005/0269525 A1 * | 12/2005 | Terken et al. | | 250/492.2 |
| 2006/0011855 A1 * | 1/2006 | Terken et al. | | 250/440.11 |
| 2010/0026104 A1 * | 2/2010 | Jajtic et al. | | 310/12.22 |

FOREIGN PATENT DOCUMENTS

| | | |
|---|---|---|
| DE | 102008059888 A1 | 6/2010 |
| WO | WO 2008040336 A1 | 4/2008 |

\* cited by examiner

*Primary Examiner* — Paul Ip
(74) *Attorney, Agent, or Firm* — Henry M Feiereisen

(57) ABSTRACT

A drive for providing high dynamics for a machine, such as a production machine, includes a short-stroke motor, and a pulse-decoupling device for decoupling pulses of the short-stroke motor from the machine using closed-loop control. The pulse-decoupling device has at least one component for use as a working-point adjustment device for adjusting a working point of the short-stroke motor. The pulse-decoupling device is thus able to assume the function of pulse decoupling and in addition, at least partially, the function of working point adjustment.

10 Claims, 1 Drawing Sheet

DRIVE FOR A MACHINE WITH PULSE-DECOUPLED WORKING POINT ADJUSTMENT

CROSS-REFERENCES TO RELATED APPLICATIONS

This application claims the priority of European Patent Application, Serial No, EP10171571, filed Aug. 2, 2010, pursuant to 35 U.S.C. 119(a)-(d), the content of which is incorporated herein by reference in its entirety as if fully set forth herein.

BACKGROUND OF THE INVENTION

The present invention relates to a drive for a machine of a type having a short-stroke motor and a pulse-decoupling device for decoupling pulses of the short-stroke motor from the machine using closed-loop control.

The following discussion of related art is provided to assist the reader in understanding the advantages of the invention, and is not to be construed as an admission that this related art is prior art to this invention.

Workpieces or tools are moved using many machines in industrial production processes. The movement is performed along fixedly predetermined axle paths. The operating speed of the machine is substantially dependent on the speed of the delivery and transport movements. In the sense of high levels of machine productivity, therefore, high axle speeds are therefore desired.

In most cases, the delivery movements, which require a certain degree of precision, are implemented by electrical servo drives which are subject to closed-loop control. If a direct drive is not used, the torque of the servomotor is transmitted to the machine carriages, which, intended to be moved linearly are with the aid of transmission elements, such as ball screw spindles, toothed belts or toothed racks, for example. Such drive systems are widespread in industrial technology.

High speeds of the linear movements are necessarily accompanied by high acceleration levels and a high degree of jerkiness (change in the acceleration per unit time). In particular, the degree of jerkiness increases dramatically with the operating speed of the servo axle. The jerkiness causes the machine structure to oscillate, and this can have a disadvantageous effect on the precision and contour accuracy of the manufacturing process. It is then often necessary to scale back the acceleration and the axle speed to such an extent that the critical jerkiness values are not exceeded. The limitation of the axle speed has a negative effect on the productivity of the machine, however. It would therefore be desirable to be able to increase the axle speed without thus exciting oscillations in the machine.

Forward-feed axles for short-stroke movements with very high dynamics (order of magnitude of accelerations: 30 g; order of magnitude of frequencies: 100 Hz), are usually in the form of linear motors with moving secondary parts (magnets). In order to keep the mass which is moved low, the secondary part with the magnets is just long enough for the coils of the primary part to always be completely covered.

It is often necessary to vary the working point of a short-stroke (linear) motor at which the short-stroke motor performs its movements. This is not possible owing to the above-described boundary conditions (secondary part which is as short as possible) with the displacement path of the short-stroke motor.

In order to adjust the working point, until now it has therefore been necessary to install the complete, pulse-decoupled unit on an additional auxiliary positioning axle, which takes on the relatively large displacement paths. This axle can become jammed during operation.

It would therefore be desirable and advantageous to address prior art shortcomings and to enable implementation of a working-point adjustment of the short-stroke motor in a simple and yet reliable manner.

SUMMARY OF THE INVENTION

According to one aspect of the present invention, a drive for a machine includes a short-stroke motor, and a pulse-decoupling device for decoupling pulses of the short-stroke motor from the machine using closed-loop control, the pulse-decoupling device having at least one component for use as a working-point adjustment device for adjusting a working point of the short-stroke motor.

The present invention resolves prior art problems by utilizing the pulse-decoupling device entirely or partially as working-point adjustment device. As a result, it is generally possible to dispense with one axle, as a result of which the stability of the machine increases overall. This in turn has a positive effect on the production quality.

According to another advantageous feature of the present invention, the short-stroke motor may be configured as a linear motor. This ensures very high dynamics.

According to another advantageous feature of the present invention, the pulse-decoupling device for decoupling and for adjusting the working point of the short-stroke motor can have a linear adjusting motor. This has the advantage that decoupling achieves a very high degree of quality since the active parts of the linear adjusting motor are not coupled to one another mechanically, but are only coupled to one another magnetically.

Alternatively, the pulse-decoupling device for decoupling and for adjusting the working point of the short-stroke motor can have a toothed belt drive, a drive with a toothed rack or a ball screw. Such drives for adjusting the working point can generally be realized in a cost-effective manner.

According to another advantageous feature of the present invention, a position of the short-stroke motor can be subjected to closed-loop control by the pulse-decoupling device during adjustment of the working point fixedly with respect to a component part of the working-point adjustment device. This eliminates the need for a mechanical stop or end-stop damper to ensure that the active parts of the short-stroke motor are not "lost" when the working point of the short-stroke motor is adjusted.

According to another aspect of the present invention, a machine includes a machine part, and a drive attached to the machine part and including a short-stroke motor; and a pulse-decoupling device for decoupling pulses of the short-stroke motor from the machine using closed-loop control, said pulse-decoupling device having at least one component for use as a working-point adjustment device for adjusting a working point of the short-stroke motor.

According to another advantageous feature of the present invention, the short-stroke motor may be configured as a short-stroke linear motor, and the pulse-decoupling device for decoupling and for adjusting the working point of the short-stroke linear motor may be configured as a linear adjusting motor. Advantageously, one active part of the linear adjusting motor is fixedly connected to the machine part, and the other active part of the linear adjusting motor is connected to one active part of the short-stroke linear motor. As a result, very effective pulse decoupling and very precise working point adjustment can be realized.

According to another advantageous feature of the present invention, mounting arrangement may be provided to support the other active part of the short-stroke linear motor in relation to one active part of the short-stroke linear motor or also in relation to the machine part or another machine part of the machine. This provides a high degree of flexibility in the configuration of the short-stroke motor.

According to another advantageous feature of the present invention, the mounting arrangement of the other active part of the short-stroke linear motor may be configured in the form of a hydraulic bearing, a pneumatic bearing or a mechanical guide (for example roller bearing, solid-state bearing (for example special leaf spring) or the like). A wear-free bearing arrangement can thus be achieved.

A drive in accordance with the present invention has the advantage over eliminating the need of guides as well as springs and dampers for pulse decoupling of the primary part since the adjustment drive is used for this purpose. A further advantage is that the adjustability of the "spring-mounting and damping" function in the embodiment of the pulse decoupling according to the invention can be realized and parameterized in a very simple manner using closed-loop control. Furthermore, the drive can have a smaller design in comparison with prior art constructions and can therefore be integrated more effectively in the working machine. In addition, fewer component parts are required, which results in reduced costs for material and processing and installation, but also in less wear.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
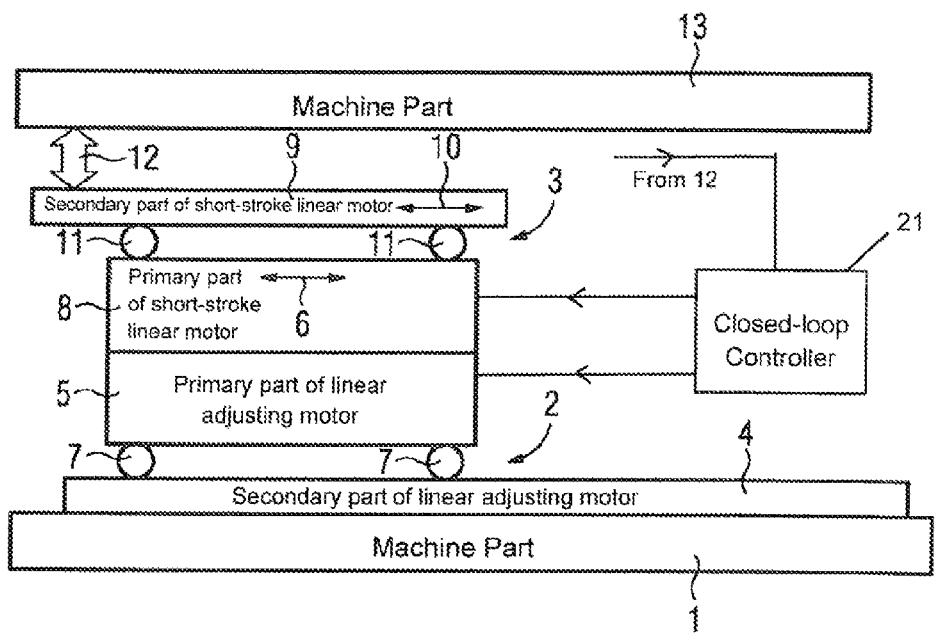
FIG. 1 shows a basic illustration of one embodiment of a drive according to the present invention with a linear motor for the adjustment axle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The present invention is based on a concept of integrating pulse-decoupling components and an additional positioning axle in one unit.

Turning now to the drawing, and in particular to FIG. 1, there is shown one example of a basic illustration of one embodiment of a drive according to the present invention. The drive includes a linear adjusting motor 2 which is fitted to a machine part 1, for example a machine frame. The linear adjusting motor 2 is used for pulse decoupling and for working point adjustment of a short-stroke linear motor 3. The linear adjusting motor 2 has a secondary part 4, which represents a first active part of the linear adjusting motor. It is installed fixedly on the machine part 1. It has permanent magnets as active components.

In this case, the primary part 5 of the linear adjusting motor 2 is mounted such that it can move linearly over the secondary part 4. The primary part 5 of the linear adjusting motor 2 is capable of moving along the movement direction 6 for the purpose of pulse decoupling and for the purpose of working point adjustment.

The primary part 5 of the linear adjusting motor 2 is mounted opposite the secondary part 4 by virtue of a bearing 7. The bearing 7 can be in the form of a ball bearing, a roller bearing or else a pneumatic or hydraulic bearing. Furthermore, the primary part 5 can also be mounted opposite the machine part 1.

A primary part 8 of the short-stroke linear motor 3 is fastened to the primary part 5 of the linear adjusting motor 2.

Figure 2:
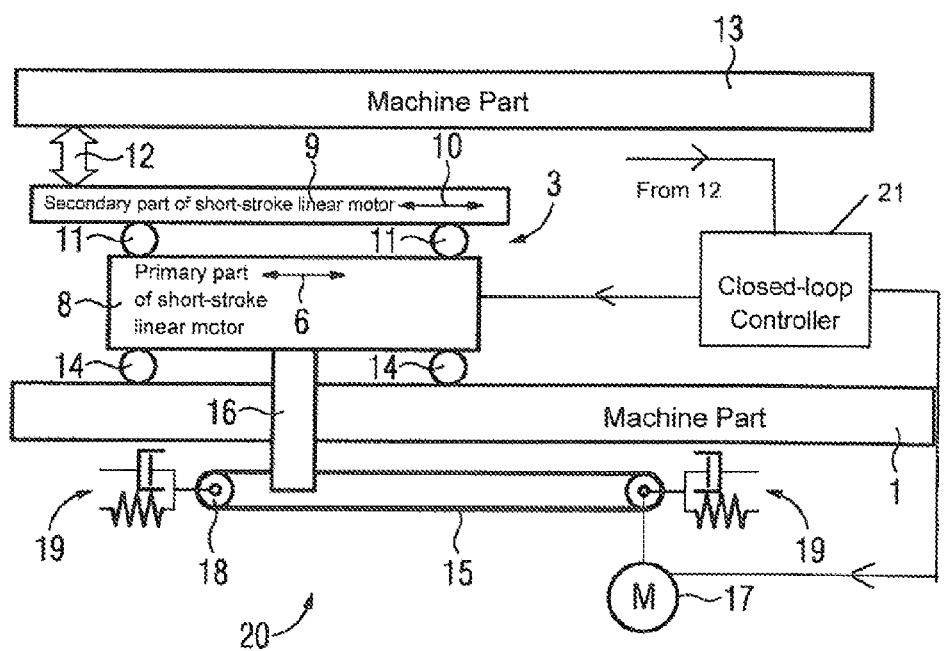
FIG. 2 shows a basic illustration of another embodiment of a drive according to the invention with a toothed belt drive for the adjustment axle.

A secondary part 9 of the short-stroke linear motor 3 performs linear movements with a short-stroke in the same direction 10 as the primary part 8 (direction 6). The secondary part 9 of the short-stroke linear motor 3 is in this case mounted on the primary part 8 with the aid of a bearing arrangement 11. The bearing arrangement 11 is preferably in the form of a hydraulic or pneumatic bearing. A path measuring device 12 (illustrated as a double arrow in FIG. 1) is used to precisely detect the displacement path or the position of the secondary part 9 of the short-stroke linear motor 3 with respect to a machine part 13 of the machine. The path measurement can also take place with respect to the abovementioned machine part 1, however, with the secondary part 4 of the linear adjusting motor 2 being fastened to said machine part 1. The values obtained from the path measurement 12 are used for the closed-loop control of the short-stroke linear motor 3 and the linear adjusting motor 2. The closed-loop control device required for this purpose is illustrated in FIGS. 1 and 2 as 21. In principle, it is intended to be connected to the primary parts of the two linear motors 2 and 3 and receives its actual value from the path measurement device 12.

As soon as the short-stroke linear motor 3 and in particular its secondary part 9 performs the desired short-stroke movements, the primary parts 5 and 8 of the two linear motors 2 and 3 perform corresponding countermovements as a result of the law of conservation of linear momentum. However, a situation in which any pulses are transmitted directly to the machine frame or a machine part 1 or 13 should be avoided. Therefore, the movement of the primary part 8 of the short-stroke linear motor 3 with respect to the machine parts 1, 13 is cushioned and damped. This takes place by virtue of corresponding closed-loop control of the linear adjusting motor 2, which therefore takes over the function of the short-stroke linear motor from the machine. In addition, it is desirable for the short-stroke linear motor 3 to be capable of being adjusted in terms of its working point (center of its short-stroke movement). Since the pulse-decoupling device is implemented in the form of a linear motor with corresponding closed-loop control, the linear motor 2 can also be used for working point adjustment. Under certain circumstances, part of the closed-loop control device for the pulse decoupling can also be used for working point adjustment. For the working point adjustment, the linear adjusting motor 2 in this case has a relatively long secondary part 4 in comparison with the secondary part 9 of the short-stroke linear motor 3. In the case of the linear adjusting motor, the mass of the secondary part 4 is virtually irrelevant, with the result that it can be as long as is required for the desired displacement path.

An alternative embodiment of the drive according to the invention is illustrated in FIG. 2. The secondary part 9 of the short-stroke linear motor 3 is intended to perform corresponding short-stroke movements with respect to a machine part 1 or 13 in this case, too. The short-stroke linear motor 3 has a primary part 8 in addition to the secondary part 9 as in the example shown in FIG. 1. The primary part 8 and secondary part 9 perform the movements in the directions 6 and 10, as in the example shown in FIG. 1. In the example shown in FIG. 2, the secondary part 9 is mounted opposite the primary part 8 likewise by means of a bearing 11.

Instead of the linear adjusting motor 2, in this case a toothed belt drive 20 is provided, with which the two functions of pulse decoupling and working point adjustment are likewise realized. For this purpose, the primary part is mounted directly on the machine part 1 by virtue of a bearing 14. A driver 16, which is capable of being moved by a toothed belt 15 in the direction 6 or 10, is fitted fixedly to the primary part 8 of the short-stroke linear motor in order to move it in a desirable manner using the toothed belt 15. The toothed belt 15 for its part is moved with the aid of its servomotor 17 and a deflection roller 18. The toothed belt drive and in particular the servomotor 17 and the deflection roller 18 are fastened to the machine part 1 by means of spring damper elements 19.

The pulses exerted on the primary part 8 in the event of the short-stroke movements of the short-stroke linear motor 3 are transmitted only with damping to the machine part 1 via the driver 16, the toothed belt 15 and the spring damping elements 19, with the result that, to a certain extent, pulse decoupling is provided between the short-stroke linear motor 3 and the machine part 1. The movement of the primary part 8 is compensated for by the toothed belt drive in a similar way to that described in document DE 101 17 460 A1. Closed-loop control as in said document is required for pulse decoupling. The corresponding closed-loop control device is not illustrated in FIG. 2 for reasons of clarity.

In this case, however, the toothed belt drive 20 is additionally designed in such a way that the working point of the short-stroke linear motor 3 can be adjusted, as in the example shown in FIG. 1. For this purpose, it has the corresponding length and its closed-loop control device is designed correspondingly. Instead of the toothed belt drive, however, it is also possible for a toothed rack drive, a ball screw or the like to be used for the additional axle.

In the "adjustment mode", the linear adjusting motor 2 or the toothed belt drive 20 is moved into the desired position on the machine frame 1, 13 by means of its servomotor 17. For this purpose, the short-stroke linear motor 3 can be disconnected, for example, and the short-stroke linear motor secondary part 9 can be carried along by the primary part 8 via end stop dampers, which prevent the secondary part 9 from being "lost". Alternatively, the secondary part 9 of the short-stroke linear motor 3 can be subjected to closed-loop control in terms of position in such a way that synchronous running with the adjustment axle 2 or 20 is ensured.

In the working mode, the closed-loop control of the linear adjusting motor 2 or servomotor 17 of the adjustment axle is set corresponding to a "spring damper characteristic" suitable for pulse decoupling, with the result that a sufficient low-pass filtering effect is achieved with respect to the machine frame 1, 13. Owing to the closed-loop control of the position of the linear adjusting motor 2 or servomotor 17, however, the primary part 8 of the short-stroke linear motor 3 is prevented from "drifting away" with respect to the machine frame or the machine parts 1, 13.

In principle, a second linear motor 2 should be preferred for the adjustment axle shown in FIG. 1 since a mechanical transmission element such as the toothed belt 15 is mounted on deflection rollers 18, whose axles can introduce the recoil forces of the short-stroke linear motor 3 as dynamic bearing forces into the machine frame 1, 13 (for example when the servomotor 17 is hard-braked). If the servomotor is subjected to "soft" closed-loop control for pulse decoupling, these forces can possibly be reduced to a sufficient extent in terms of frequency content (in particular relatively high frequencies can be reduced by the spring/damper function). If this is unsuccessful, the bearings of the electromechanical drive also need to have a spring/damper structure. Alternatively, for example, the toothed belt 15 can be designed to be correspondingly soft.

As has already been indicated above, the short-stroke linear motor secondary part 9 can be mounted both against the machine frame 1, 13 or, as in the illustrated case, against the primary part 8. Likewise, the primary and secondary parts of the short-stroke linear motor 3, but also of the linear adjusting motor 2, are in principle interchangeable. Various embodiments are possible as guides or bearings. In the case of very short-stroke movements, wear-free embodiments (for example hydraulic bearings or pneumatic bearings) are preferred.

A mechanically stable precision path measurement of the short-stroke linear motor part (secondary part 9) with respect to the machine frame (machine part 13) is decisive for the processing accuracy and can compensate for both steady-state and dynamic incorrect positions of the adjustment axle 2, 20 since the closed-loop control of the position of the short-stroke axle 3 needs to be implemented with a correspondingly high bandwidth in terms of closed-loop control.

An axle of a milling machine can be cited as an example for the application of the above-mentioned drive. The machine part 1 or 13 would then be a machine bed or a gateway-type design, for example.

The above exemplary embodiments relate to linear drives. However, it is likewise possible for the short-stroke motor to be a rotary stepper motor, for example. Likewise, the short-stroke motor can perform any desired nonlinear movement. The pulse-decoupling device then needs to be designed geometrically in a corresponding manner such that, by virtue of said pulse-decoupling device, both pulse decoupling and working point adjustment are possible.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive for a machine, said drive comprising:
   a short-stroke motor;
   a path measuring device detecting a position of a secondary part of the short-stroke motor with respect to a machine part of the machine,
   a closed-loop controller receiving an input signal representing the detected position, and
   a pulse-decoupling device receiving control signals from the closed-loop controller and controlling at least one working-point adjustment device comprising a linear adjusting motor or an adjustment drive for adjusting a working point of the short-stroke motor so as to decouple pulses of the short-stroke motor from the machine using the closed-loop control.

2. The drive of claim 1, wherein the short-stroke motor is a linear motor.

3. The drive of claim 1, wherein the adjustment drive is a toothed belt drive, a drive with a toothed rack, or a ball screw.

4. The drive of claim 1, wherein the pulse-decoupling device is configured to fix a position of the short-stroke motor with respect to the working-point adjustment device during adjustment of the working point.

5. A machine, comprising:
a first machine part; and
a drive attached to the first machine part and including a short-stroke motor;
a path measuring device detecting a position of a secondary part of the short-stroke motor with respect to the first machine part of the machine,
a closed-loop controller receiving an input signal representing the detected position, and
a pulse-decoupling device receiving control signals from the closed-loop controller and controlling at least one working-point adjustment device comprising a linear adjusting motor or an adjustment drive for adjusting a working point of the short-stroke motor so as to decouple pulses of the short-stroke motor from the machine based on the control signals received from the closed-loop controller.

6. The machine of claim 5, wherein the short-stroke motor is a short-stroke linear motor, and wherein the linear adjusting motor comprises one active part which is connected to a second machine part, and another active part which is connected to one active part of the short-stroke linear motor.

7. The machine of claim 6, wherein the other active part of the short-stroke linear motor is supported on the one active part of the short-stroke linear motor.

8. The machine of claim 7, wherein the other active part of the short-stroke linear motor is mounted by way of a hydraulic bearing, a pneumatic bearing, or a mechanical guide.

9. The machine of claim 6, wherein the other active part of the short-stroke linear motor is mounted facing the first machine part.

10. The machine of claim 9, wherein the other active part of the short-stroke linear motor is mounted by way of a hydraulic bearing, a pneumatic bearing, or a mechanical guide.

* * * * *